US010319153B2

United States Patent
Nagahari et al.

(10) Patent No.: US 10,319,153 B2
(45) Date of Patent: Jun. 11, 2019

(54) THREE-DIMENSIONAL SHAPE COLOR ADJUSTMENT METHOD, THREE-DIMENSIONAL OBJECT SHAPING METHOD, AND THREE-DIMENSIONAL SHAPE COLOR ADJUSTMENT APPARATUS

(71) Applicant: MIMAKI ENGINEERING CO., LTD., Nagano (JP)

(72) Inventors: Masaya Nagahari, Nagano (JP); Hiroyoshi Ohi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/687,892

(22) Filed: Aug. 28, 2017

(65) Prior Publication Data

US 2018/0061140 A1   Mar. 1, 2018

(30) Foreign Application Priority Data

Aug. 31, 2016 (JP) ................................ 2016-170340

(51) Int. Cl.
*H04N 1/60* (2006.01)
*B33Y 50/02* (2015.01)
(Continued)

(52) U.S. Cl.
CPC ............ *G06T 19/20* (2013.01); *B29C 64/393* (2017.08); *B33Y 50/02* (2014.12); *H04N 1/60* (2013.01);
(Continued)

(58) Field of Classification Search
None
See application file for complete search history.

(56) References Cited

U.S. PATENT DOCUMENTS

2008/0062442 A1   3/2008  Olson
2015/0165695 A1*  6/2015  Chen .................. B29C 67/0096
                                                    425/132

FOREIGN PATENT DOCUMENTS

EP     1635297 A1    3/2006
WO  2016119902 A1    8/2016

OTHER PUBLICATIONS

Extended European Search Report dated Jan. 30, 2018 issued in the corresponding European patent application No. 17187305.2.
(Continued)

*Primary Examiner* — YuJang Tswei
(74) *Attorney, Agent, or Firm* — Rankin, Hill & Clark LLP

(57) ABSTRACT

A color adjustment unit in a shaping controller includes a 3D/2D conversion unit which converts 3D data representing a three-dimensional object having colored layers formed on the surface thereof into 2D data; a two-dimensional color patch data creating unit which creates, as two-dimensional color patch data, a plurality of 2D images in which at least one kind of parameter of a plurality of kinds of parameters related to a color of each layer of the colored layers in the converted 2D data is set at a plurality of different levels; a three-dimensional color patch data creating unit which applies thickness information about thicknesses of the colored layers depending on the number of layers of the colored layers to the two-dimensional color patch data to create three-dimensional color patch data; and a color patch layering unit which layers three-dimensional color patches depending on the thickness according to the three-dimensional color patch data.

16 Claims, 4 Drawing Sheets

(51) Int. Cl.
*G06T 19/20* (2011.01)
*B29C 64/386* (2017.01)
*B29C 64/393* (2017.01)

(52) U.S. Cl.
CPC ...... *B29C 64/386* (2017.08); *B29K 2995/002* (2013.01); *G06T 2219/008* (2013.01); *G06T 2219/012* (2013.01); *G06T 2219/2012* (2013.01); *G06T 2219/2016* (2013.01); *H04N 1/6013* (2013.01)

(56) References Cited

OTHER PUBLICATIONS

P Walters et al: "3D printing in colour: technical evaluation and creative applications", 2009, Retrieved from the Internet: URL:https://pdfs.semanticscholar.org/86d1/e54d3c1c56cb91cc7ccfdd4eb9843ce23da3.pdf [retrieved on Jan. 18, 2018]; Cited in EESR.

Guangxue Chen et al: "Color 3D Printing: Theory, Method, and Application" In: "New Trends in 3D Printing", 2016, pp. 25-51, InTech; Cited in EESR.

\* cited by examiner

THREE-DIMENSIONAL SHAPE COLOR ADJUSTMENT METHOD, THREE-DIMENSIONAL OBJECT SHAPING METHOD, AND THREE-DIMENSIONAL SHAPE COLOR ADJUSTMENT APPARATUS

CROSS REFERENCE TO RELATED APPLICATIONS

This application claims the priority benefit of Japanese Patent Application No. 2016-170340, filed on Aug. 31, 2016. The entirety of the above-mentioned patent application is hereby incorporated by reference herein and made a part of this specification.

TECHNICAL FIELD

The present disclosure relates to a three-dimensional shape color adjustment method for performing color adjustment in a three-dimensional object having a color part.

DESCRIPTION OF THE BACKGROUND ART

In a three-dimensional object shaping apparatus such as a 3D printer, when a three-dimensional object having a color part is shaped, a color part is formed in a shaped object by using a color ink according to each shaping method such as an ink jet method. For example, in a three-dimensional shaping system described in Japanese Patent Application Laid-Open No. 2003-145630 (published on May 20, 2003), a technique in which a color area of a part having a sectional body exposed to the outside and an surface image to perform mapping to three-dimensional model data are overlapped to each other to create coloring data for each sectional body is disclosed. In this three-dimensional shaping system, a color part (colored layer) is formed based on coloring data every time one layer is formed.

SUMMARY

However, in the above three-dimensional shaping system, the colors of colored layers including a plurality of layers formed on the surface of the three-dimensional object by using ink based on the coloring data are frequently different from the colors of a three-dimensional model which can be checked on a screen, depending on the thicknesses of the colored layers and color expression on a model material serving as a base. Therefore, when the colors of the colored layers of the three-dimensional object are different from desired colors, the colors of the three-dimensional model must be adjusted again. In this way, since the colors of the colored layers of the three-dimensional object cannot be checked unless an actually shaped three-dimensional object is colored, operations including shaping, coloring, and color adjustment for the three-dimensional model must be repeated until the colors of the colored layers of the three-dimensional object become the desired colors. Therefore, it takes a long period of time until the colors of the colored layers are fixed.

The present disclosure has been made in consideration of the above problems, and aims to efficiently color a three-dimensional object.

In order to solve the above problems, a three-dimensional shape color adjustment method according to the present disclosure includes: a data conversion step of converting three-dimensional data representing a three-dimensional object having colored layers formed on a surface thereof into two-dimensional data; a two-dimensional color patch data creation step of creating, as two-dimensional color patch data, a plurality of two-dimensional images in which at least one kind of parameter of a plurality of kinds of parameters related to a color of each layer of the colored layers in the converted two-dimensional data is set at a plurality of different levels; a three-dimensional color patch data creating step of applying thickness information about thicknesses of the colored layers depending on the number of layers of the colored layers to the two-dimensional color patch data to create three-dimensional color patch data; and a color patch layering step of layering three-dimensional color patches depending on the thickness information in the three-dimensional color patch data.

In order to solve the above problems, a three-dimensional shape color adjustment apparatus according to the present disclosure includes: a data conversion unit which converts three-dimensional data representing a three-dimensional object having colored layers formed on a surface thereof into two-dimensional data; a two-dimensional color patch data creating unit which creates, as two-dimensional color patch data, a plurality of two-dimensional images in which at least one kind of parameter of a plurality of kinds of parameters related to a color of each layer of the colored layers in the converted two-dimensional data is set at a plurality of different levels; a three-dimensional color patch data creating unit which applies thickness information about thicknesses of the colored layers depending on the number of layers of the colored layers to the two-dimensional color patch data to create three-dimensional color patch data; and a color patch layering unit which layers three-dimensional color patches depending on the thickness according to the three-dimensional color patch data.

According to the above configuration, since the two-dimensional color patches are layered to correspond to the colored layers formed on the three-dimensional object, a state having colors close to the colors of the colored layers can be obtained by the layered two-dimensional color patches. In addition, since a three-dimensional object need not be actually modeled and colored, time to check the colors can be shortened.

The three-dimensional shape color adjustment method preferably further includes a parameter change step of changing the parameters, and a three-dimensional object display step of displaying the three-dimensional object based on the three-dimensional data of the three-dimensional object in which the colors of the colored layers are changed based on the changed parameters.

In the above configuration, the parameters are changed to change color states of the three-dimensional object. As a result, a user can check the color states of before and after the change of the parameters with the displayed three-dimensional object. In this manner, the colors of the colored layers can be made close to the desired colors without repeating modeling and coloring of a 3D model.

In the three-dimensional shape color adjustment method, the color patch layering step preferably causes a three-dimensional object shaping apparatus to form the colored layers depending on layering of three-dimensional color patches on a layer of a model material formed based on the two-dimensional data. As a result, since the colored layers are formed on the layer of the model material formed based on the two-dimensional data depending on layering of the two-dimensional color patches, colors close to the colors of the colored layers on the actually formed three-dimensional object can be obtained.

The three-dimensional shape color adjustment method preferably includes a light source invalidation step of invalidating a light source which is set for the three-dimensional data converted in the data conversion step and which irradiates light on the three-dimensional object. In this manner, the light source is invalidated to make it possible to obtain two-dimensional data based on three-dimensional data which is not affected by light. Therefore, desired colors can be reproduced more accurately.

The three-dimensional shape color adjustment method preferably includes a direction changing step of reflecting a changed direction of the three-dimensional object in the three-dimensional data converted in the data conversion step. Accordingly, since the changed direction of the three-dimensional object is reflected in the three-dimensional data, the colors of the colored layers can be checked with respect to a three-dimensional object arranged in a desired direction.

In the three-dimensional object shaping method according to the present disclosure, the colored layers are formed on the surface of the three-dimensional object by using the parameters determined by any one of the three-dimensional shape color adjustment methods described above. As a result, parameters close to desired colors can be set by the three-dimensional shape color adjustment method. Therefore, colored layers are formed on the surface of a three-dimensional object by using the parameters to make it possible to obtain colored layers having colors close to desired colors.

According to one embodiment of the present disclosure, a three-dimensional object is advantageously and efficiently colored.

DETAILED DESCRIPTION OF EMBODIMENT

Figure 1:
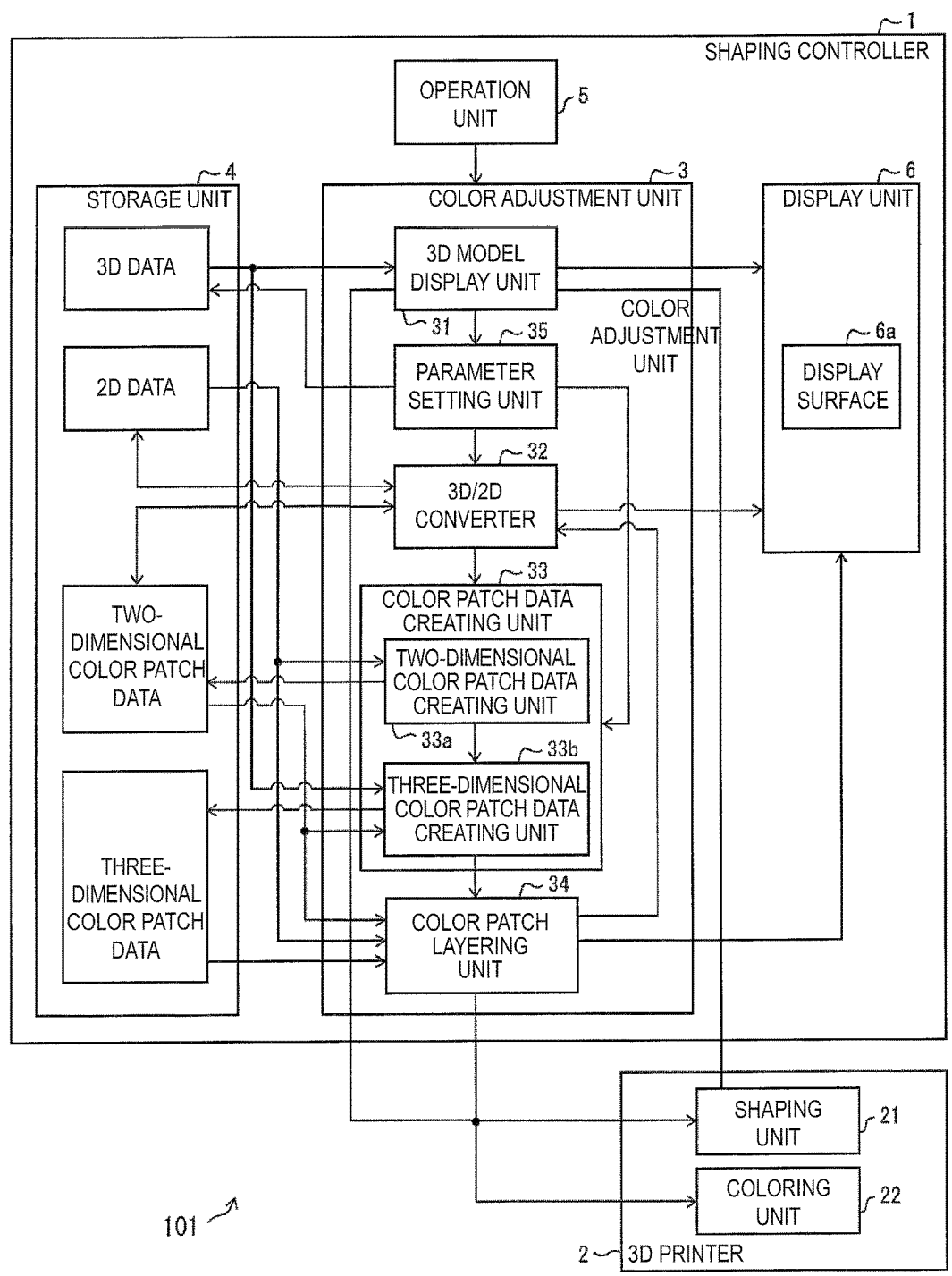
FIG. 1 is a block diagram showing a configuration of a three-dimensional shaping system according to an embodiment of the present disclosure.
Figure 2:
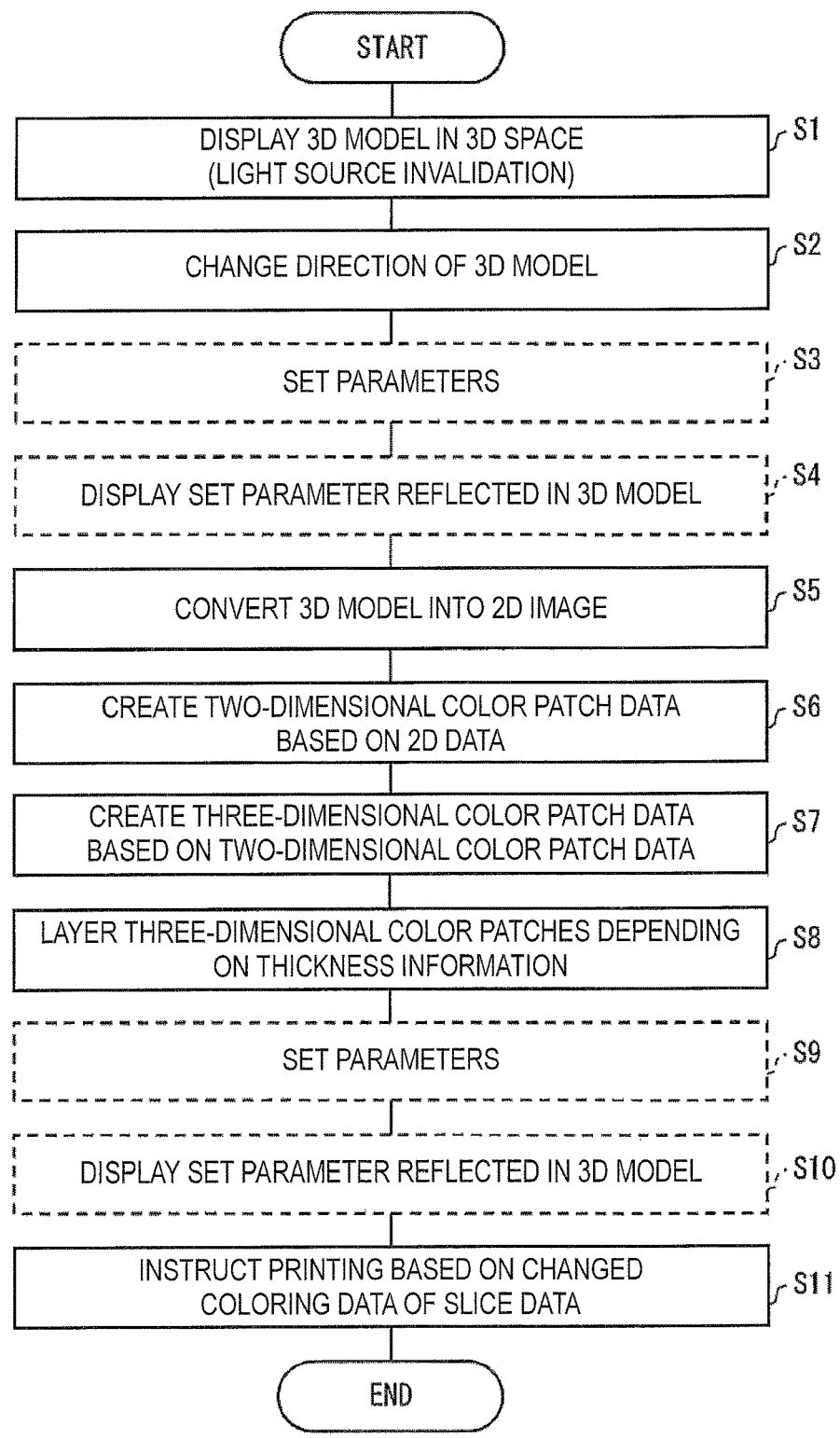
FIG. 2 is a flowchart showing a procedure of color adjustment by the color adjustment unit described above.
Figure 3:
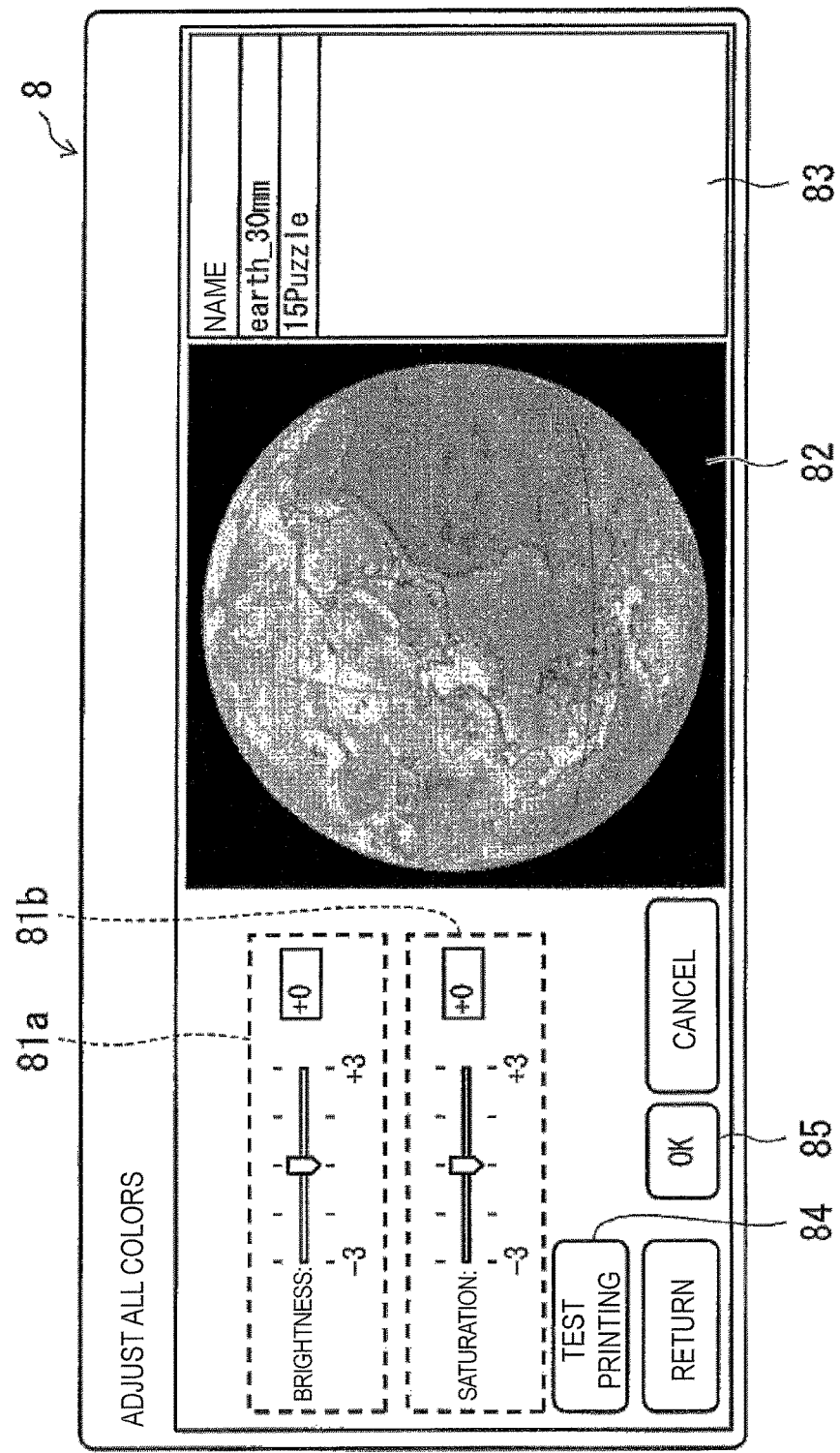
FIG. 3 is a diagram showing an example of a parameter setting screen that a parameter setting unit in a shaping controller in the three-dimensional shaping system displays to set parameters.
Figure 4:
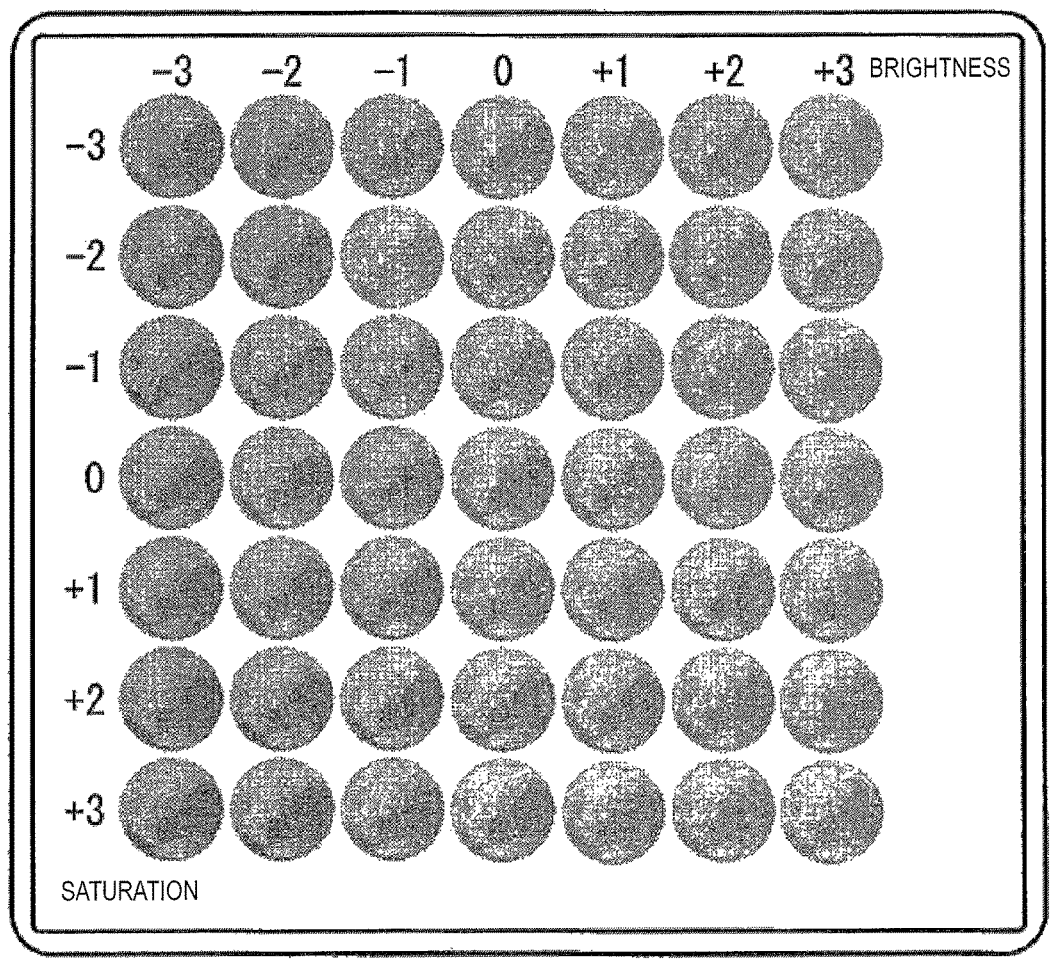
FIG. 4 is a diagram showing an example of a color patch created by a two-dimensional color patch data creating unit of a color adjustment unit in the shaping controller.

An embodiment of the present disclosure will be described below with reference to FIGS. 1 to 4. FIG. 1 is a block diagram showing a configuration of a three-dimensional shaping system 101 according to this embodiment. FIG. 2 is a flowchart showing the procedure of color adjustment by a color adjustment unit 3. FIG. 3 is a diagram showing an example of a parameter setting screen 8 displayed by a parameter setting unit 35 in a shaping controller 1 to set parameters. FIG. 4 is a diagram showing an example of color patches created by a two-dimensional color patch data creating unit 33a of the color adjustment unit 3 in the shaping controller 1.

[Basic Configuration of Three-Dimensional Shaping System 101]

As shown in FIG. 1, the three-dimensional shaping system 101 includes a shaping controller 1 and a 3D printer 2. The shaping controller 1 is a device which controls shaping of a three-dimensional object by a 3D printer 2, and creates, for color adjustment, shaping data used for shaping a 3D model (three-dimensional object) and coloring data used for coloring the 3D model to output the shaping data and the coloring data to the 3D printer 2. The 3D printer 2 is a three-dimensional object shaping apparatus which shapes and colors a 3D model based on the shaping data and the coloring data from the shaping controller 1, and includes a shaping unit 21 for shaping a three-dimensional object and a coloring unit 22 for coloring the surface of the 3D model. The shaping unit 21 shapes a 3D model by layering model materials using a known method such as an optical shaping method, a powder sintering layer method, a fused deposition shaping method, or an ink jet method. The coloring unit 22 colors the surface or the interior of the layers of the formed model material and discharges inks such as a UV curable ink in each layer to a corresponding position on the surface or interior of the model material by, for example, the ink jet method.

[Configuration of Shaping Controller 1]

The shaping controller 1 includes the color adjustment unit 3, a storage unit 4, an operation unit 5, and a display unit 6. The storage unit 4 includes a storage device such as a hard disk device and a ROM (Read Only Memory) that always stores data and programs, a memory such as a RAM (Random Access Memory) used for temporary storage, and the like. The operation unit 5 is provided for the user to operate the shaping controller 1 and includes input devices such as a mouse, a keyboard, a touch panel, and the like. The display unit 6 is disposed to display a 3D model or the like, includes a display device such as a liquid crystal panel, and has a display surface 6a for displaying an image.

The storage unit 4 stores at least 3D data, 2D data, two-dimensional color patch data, and three-dimensional color patch data. The 3D data includes data representing the shape of a 3D model and data representing the color of each layer of colored layers including a plurality of layers formed on the surface of the 3D model, and is created by 3D modeling software such as 3D-CAD software and 3D-CG. Some 3D modeling software arrange a light source to make it possible to check the color shade of a 3D model and the shadow of the 3D model depending on directions in which light is irradiated on the 3D model. The 2D data, the two-dimensional color patch data, and the three-dimensional color patch data will be described later in detail.

In order to adjust the color for coloring the surface of the three-dimensional object, the color adjustment unit 3 includes a 3D model display unit 31, a 3D/2D conversion unit 32, a color patch data creating unit 33, a color patch layering unit 34, and a parameter setting unit 35. The shaping controller 1 functions as a three-dimensional shape color adjustment apparatus by having the color adjustment unit 3.

The 3D model display unit 31 displays the 3D model on the display surface 6a of the display unit 6 based on the 3D data (three-dimensional data) stored in the storage unit 4. The 3D model display unit 31 changes the directions of the 3D model to be displayed depending on an operation of the user. When the 3D data includes information on the light source described above, the 3D model display unit 31 invalidates (turns off) setting of the light source to display a 3D model on which no light is irradiated.

The 3D/2D conversion unit 32 (data conversion unit) converts the 3D model image displayed on the display surface 6a by the 3D model display unit 31 into 2D data serving as 2D image data. Specifically, the 3D/2D conversion unit 32 acquires 2D data by capturing a 3D model image displayed as a 2D image (two-dimensional image).

The color patch data creating unit 33 includes the two-dimensional color patch data creating unit 33a and the three-dimensional color patch data creating unit 33b.

The two-dimensional color patch data creating unit 33a creates, as data of two-dimensional color patches (two-dimensional color patch data), a plurality of 2D images in which at least one kind of parameter of two or more kind of parameters related to a color of each layer of colored layers of the 3D model at a plurality of different levels based on the 2D data described above. The color patch data creating unit 33 causes the storage unit 4 to store the created two-dimensional color patch data. As the above parameters, a brightness, a saturation, a hue, and a color of a model material are given. However, the parameters are not limited to the given parameters, and may be, for example, color densities of C (cyan), M (magenta), and Y (yellow). In addition, when the settings of the parameters are changed by the parameter setting unit 35 (described later), the two-dimensional color patch data creating unit 33a changes the two-dimensional color patch data according to the changed parameters.

The three-dimensional color patch data creating unit 33b creates data of three-dimensional color patches (three-dimensional color patch data) based on the two-dimensional color patch data. Three-dimensional color patch data is obtained by applying, to the two-dimensional color patch data, thickness information about the thicknesses (the number of layers of colored layers) of the colored layers to be formed on the three-dimensional object to be shaped.

The color patch layering unit 34 creates three-dimensional color patch data obtained by giving thicknesses to the two-dimensional color patches depending on the thickness information (the number of layers or layer thickness) in the three-dimensional color patch data. Furthermore, the color patch layering unit 34 creates output data for test printing based on the three-dimensional color patch data. Specifically, the color patch layering unit 34 outputs slice data (tool path data) as output data including the shaping data and the coloring data described above. Therefore, the color patch layering unit 34 converts the three-dimensional color patch data into STL (STereo Lithography) type and converts the three-dimensional color patch data converted into the STL data into slice data representing parts sliced into a plurality of layers.

The parameter setting unit 35 is disposed to set the above parameters designated by an operation of the user using the operation unit 5. The parameter setting unit 35 causes the display unit 6 to display a GUI (Graphical User Interface) for setting parameters. An example of the GUI will be described later in detail.

[Color Adjustment Operation]

An operation of color adjustment by the color adjustment unit 3 of the shaping controller 1 configured as described above will be described.

First, as shown in FIG. 2, based on the 3D data read from the storage unit 4 by the 3D model display unit 31, the 3D model is displayed on the display surface 6a of the display unit 6 (step S1). At this time, when the light source is set in the 3D data, the 3D model display unit 31 invalidates the setting (light source invalidation step). Since the 3D model is displayed with a default direction, the user performs an operation of changing the directions of the 3D model by using the operation unit 5 to have a desired direction. Therefore, on a screen (not shown) for displaying the 3D model on the display surface 6a, a GUI is set for the user to change the directions of the 3D model. The 3D model display unit 31 receives an operation of changing the directions of the 3D model by the user, and changes the directions of the displayed 3D model (step S2, direction changing step).

The parameter setting unit 35 makes it possible for the user to designate parameters for the 3D model. At this time, the parameter setting unit 35 causes the parameter setting screen 8 as shown in FIG. 3 to be displayed on the display surface 6a to designate the parameters.

The parameter setting screen 8 includes parameter adjustment sliders 81a and 81b, an adjustment preview 82, a model list display column 83, a test print button 84, an OK button 85, and the like. The parameter adjustment sliders 81a and 81b are configured to select parameters by sliding knobs. The adjustment preview 82 is disposed to display the 3D data. The model list display column 83 is disposed to display a list of names of the 3D data displayed on the adjustment preview 82. The test print button 84 is disposed to perform an operation of instructing test printing by the color patch layering unit 34.

The parameter setting screen 8 shown in FIG. 3 displays a 3D model of a globe on the adjustment preview 82. Further, the parameter setting screen 8 includes a parameter adjustment slider 81a for adjusting lightness and a parameter adjustment slider 81b for adjusting saturation. However, when the parameters change, a parameter adjustment slider depending on the changed parameters is disposed. For example, a parameter adjustment slider may be disposed by using the color densities of inks (Y, M, and C) for coloring as parameters.

When the user designates parameters by using the parameter adjustment sliders 81a and 81b on the parameter setting screen 8 and then turns on the OK button 85, the parameter setting unit 35 sets the designated parameters (step S3, parameter change step) to change the parameters of the 3D data. At this time, the 3D model display unit 31 reflects the changed parameter in the 3D model and then displays the 3D model on the adjustment preview 82 (step S4, three-dimensional object display step).

The 3D model display unit 31 may also reflect angle information of the 3D model in step S4 to display the 3D model. Since the color shade of the 3D model changes depending on angles, the angle information is reflected in the 3D model to make it possible to display the 3D model in a state having colors close to the colors of the actually formed colored layers. Since the angle information is acquired from polygon data, STL data including the polygon data must be created in advance. The STL data will be described later.

Next, the 3D/2D conversion unit 32 converts the 3D model image displayed on the adjustment preview 82 into a 2D image by capturing the 3D model image (step S5, data conversion step), and stores the 2D data of the 2D image in the storage unit 4.

Next, the two-dimensional color patch data creating unit 33a creates two-dimensional color patch data based on the 2D data (step S6, two-dimensional color patch data creation step), and stores the two-dimensional color patch data in the storage unit 4. For example, as shown in FIG. 4, the two-dimensional color patch data created by the two-dimensional color patch data creating unit 33a is created as a plurality of 2D images in which parameters are set at a plurality of different levels, respectively. The two-dimensional color patches shown in FIG. 4 are examples in which a brightness and a saturation are employed as parameters, and values are reflected in the two-dimensional color patches as the brightness and the saturation being biaxial values. Subsequently, the three-dimensional color patch data creating unit 33b creates three-dimensional color patch data based on the two-dimensional color patch data to include the thickness information described above (step S7, three-dimensional color patch data creation step), and stores the three-dimensional color patch data in the storage unit 4.

Then, the color patch layering unit 34 layers three-dimensional color patches depending on the thickness information in the three-dimensional color patch data (step S8, color patch layering step). The color patch layering unit 34 causes the display unit 6 to display the layered three-dimensional color patches. The user visually checks the displayed three-dimensional color patches in the layered state to make it possible to confirm colors closest to the desired colors.

Subsequently, after the same processing as that in the above step S3 is performed as step S9, the same processing as that in the above step S4 is performed as step S10. All of the processings in steps S3, S4, S9, and S10 may be omitted, or only the processings in steps S9 and S10 may be performed, or only the processings in steps S3 and S4 may be performed. Therefore, after steps S2 and S8, a processing that determines whether the processings in steps S3 and S9 are performed may be added, respectively.

When final parameters are determined after checking the color with the layered three-dimensional color patches and changing the parameters as described above, when the user presses the test print button 84 on the parameter setting screen 8 shown in FIG. 4 to execute test printing, the color patch layering unit 34 instructs the 3D printer 2 to execute the test printing. Upon receiving this instruction, the color patch layering unit 34 instructs printing based on the changed coloring data of the slice data (step S11). This slice data is based on the 2D data in which two-dimensional color patches are incorporated.

Upon receiving the slice data, the shaping unit 21 of the 3D printer 2 forms several model material layers, and the coloring unit 22 of the 3D printer 2 performs printing (coloring) based on the two-dimensional color patches on the formed model material layers. At this time, even though only one model material layer is formed, light is transmitted through the model material layer. For this reason, several model material layers are formed to obtain a certain thickness, and color inks are layered by performing printing two or more times to have a thickness of 300 μm. In this way, pseudo three-dimensional colors can be expressed on a plane (two-dimensional). The user visually checks the coloring state of the model materials planarly formed in this manner to make it possible to confirm colors close to the colors in the coloring state of the 3D model. Instead of layering model materials as described above, the 3D printer 2 may perform printing on a sheet having a color shade which is the same as (which is different from) the color shade of the model materials or may perform printing on a sheet of paper having a thickness or density at which light is not transmitted.

[Effect of Color Adjustment]

As described above, the shaping controller 1 according to the embodiment includes the color adjustment unit 3 to create two-dimensional color patch data based on a 2D image converted from a 3D model, to create three-dimensional color patch data based on the two-dimensional color patch data, further, to layer color patches depending on thicknesses (the number of layers) of colored layers based on the three-dimensional color patch data so as to display the layered three-dimensional color patches. As a result, colors close to the colors of the colored layers of the 3D model can be expressed with the layered three-dimensional color patches. Thus, the color of the colored layer of the 3D model can be checked in a short period of time without actually forming the 3D model.

Further, when the parameter setting is changed by the parameter setting unit 35, the color state of the two-dimensional color patches changes based on the changed parameters. As a result, the user can check the color states of before and after the change of the parameters with the two-dimensional color patches in the layered state displayed.

Further, when test printing is performed on model materials planarly formed in several layers based on the two-dimensional color patch data by the color patch layering unit 34, the colors of the colored layers can be checked within a period of time shorter than a period of time for which the colors of the colored layers of a 3D model are checked by actually forming the 3D model. Thereby, a 3D model need not be formed to check the coloring state of the colored layers.

In this embodiment, in the test printing described above, the model materials are planarly layered. However, the model materials need not be always planarly layered. For example, partial 3D data obtained by partially cutting a 3D model from 3D data may be acquired, and a partial 3D model may be formed based on the 3D data, so that test printing may be performed on this 3D model. Even with such a method, the colors of some colored layers can be confirmed without completing the 3D model. Therefore, a period of time to check the colors of the colored layers can be shortened.

[Implementation Example by Software]

The color adjustment unit 3, which is a control block of the shaping controller 1, is achieved by software using a CPU (Central Processing Unit). Alternatively, the color adjustment unit 3 may be achieved by a logical circuit (hardware) formed in an integrated circuit (IC chip) or the like.

In the former case, the shaping controller 1 is configured, for example, by a general-purpose computer device such as a personal computer, and includes a CPU for executing the instructions of a program serving as a software which achieves the functions of the color adjustment unit 3, a ROM (Read Only Memory) or a storage device (these are referred to as "recording media") in which the program and various data are stored to be able to be read by a computer (or CPU), a RAM (Random Access Memory) in which the program is developed, and the like. Then, the computer device (or CPU) reads the program from the recording medium and executes the program to achieve the aim of the present disclosure. As the recording medium, a "non-temporary tangible medium" such as a tape, a disk, a card, a semiconductor memory, or a programmable logic circuit can be used. Further, the program may be supplied to the computer via an arbitrary transmission medium (communication network, broadcast wave, or the like) capable of transmitting the program. The present disclosure can also be achieved in the form of a data signal embedded in a carrier wave, the program being embodied by electronic transmission.

<Additional Regard>

One aspect of a three-dimensional shape color adjustment method according to the present disclosure includes: a data conversion step (step S3) of converting 3D data representing a 3D model having colored layers formed on the surface thereof into 2D data; a two-dimensional color patch data creation step (step S6) of creating, as two-dimensional color patch data, a plurality of two-dimensional images in which at least one kind of parameter of a plurality of kinds of parameters related to a color of each layer of the colored layers in the converted two-dimensional data is set at a plurality of different levels; a three-dimensional color patch data creation step (step S7) of applying thickness information about thicknesses of the colored layers depending on the number of layers of the colored layers to the two-dimensional color patch data to create three-dimensional color patch data; and a color patch layering step (step S8) of layering three-dimensional color patches depending on the thickness information in the three-dimensional color patch data.

Further, the shaping controller 1 includes: the 3D/2D conversion unit 32 which converts 3D data representing a three-dimensional object having colored layers formed on the surface thereof into 2D data; the two-dimensional color patch data creating unit 33a which creates, as two-dimensional color patch data, a plurality of 2D images in which at least one kind of parameter of a plurality of kinds of parameters related to a color of each layer of the colored layers in the converted 2D data is set at a plurality of different levels; the three-dimensional color patch data creating unit 33b which applies thickness information about thicknesses of the colored layers depending on the number of layers of the colored layers to the two-dimensional color patch data to create three-dimensional color patch data and the color patch layering unit 34 which layers three-dimensional color patches depending on the thickness information in the three-dimensional color patch data.

According to the above configuration, since the two-dimensional color patches are layered to correspond to the colored layers formed on the 3D model, a state having colors close to the colors of the colored layers can be obtained by the layered two-dimensional color patches. In addition, since the 3D model need not be actually shaped and colored, a time for checking the colors can be shortened.

The three-dimensional shape color adjustment method further includes a parameter change step (step S4) of changing parameters, and a three-dimensional object display step (step S5) of displaying a 3D model based on the three-dimensional data of the three-dimensional object having the colored layers changed in color based on the parameters. In the above configuration, the parameters are changed to change color states of the three-dimensional object. As a result, the user can check the color states of before and after the change of the parameters with the displayed three-dimensional object. In this manner, the colors of the colored layers can be made close to the desired colors without repeating shaping and coloring of a 3D model.

In the three-dimensional shape color adjustment method, the color patch layering step causes the 3D printer 2 to form colored layers depending on the layering of the three-dimensional color patches on the layers of the model materials formed based on the two-dimensional data. As a result, since the colored layers are formed according to layering of the two-dimensional color patches on the layers of the model materials formed based on the two-dimensional data, the colors close to the colors of the colored layers in the actually formed 3D model can be obtained.

The three-dimensional shape color adjustment method includes a light source invalidation step of invalidating a light source that irradiates light on the three-dimensional object set in the three-dimensional data converted in the data conversion step. When the light source is invalidated, two-dimensional data can be obtained based on three-dimensional data which is not affected by light. Therefore, desired colors can be reproduced more accurately.

The three-dimensional shape color adjustment method includes an direction changing step (step S2) of reflecting the changed direction of the 3D model in the three-dimensional data converted by the data conversion step. Accordingly, since the changed direction of the three-dimensional object is reflected in the three-dimensional data, the colors of the colored layers can be checked with respect to a three-dimensional object arranged in a desired direction.

In the three-dimensional object shaping method according to the present disclosure, colored layers are formed on the surface of a 3D model by using the parameters determined by any one of the three-dimensional shape color adjustment methods described above. As a result, parameters close to desired colors can be set by the three-dimensional shape color adjustment method. Therefore, the colored layers are formed on the surface of the 3D model by using the parameters to make it possible to obtain colored layers having colors close to desired colors.

The present disclosure is not limited to the above embodiments, and various modifications can be made within the scope described in the claims, and embodiments obtained by appropriately combining technical means respectively disclosed in different embodiments are also included in the technical scope of the present disclosure. Further, the technical means disclosed in the embodiments are combined to each other to make it possible to form new technical features.

INDUSTRIAL APPLICABILITY

The present disclosure can be preferably used for the purpose of adjustment for the colors of a three-dimensional object.

What is claimed is:

1. A three-dimensional shape color adjustment method comprising:
   a data conversion step of converting three-dimensional data representing a three-dimensional object having colored layers formed on a surface of the three-dimensional object into two-dimensional data;
   a two-dimensional color patch data creation step of creating, as two-dimensional color patch data, a plurality of two-dimensional images in which at least one kind of parameter of a plurality of kinds of parameters related to a color of each layer of the colored layers in the converted two-dimensional data is set at a plurality of different levels;
   a three-dimensional color patch data creation step of applying thickness information about thicknesses of the colored layers depending on the number of layers of the colored layers to the two-dimensional color patch data to create three-dimensional color patch data; and
   a color patch layering step of laminating three-dimensional color patches depending on the thickness information in the three-dimensional color patch data, wherein
   the colored layers are formed with a plurality of inks by an inkjet method, and
   the two-dimensional color patch data creation step comprises adjusting a color density parameter of each of the plurality of inks to create the two-dimensional color patch data.

2. The three-dimensional shape color adjustment method according to claim 1, further comprising:
   a parameter change step of changing the parameters, and
   a three-dimensional object display step of displaying the three-dimensional object based on the three-dimensional data of the three-dimensional object having the colored layers changed in color based on the changed parameters.

3. The three-dimensional shape color adjustment method according to claim 2, comprising a light source invalidation step of invalidating a light source which is set in the three-dimensional data converted in the data conversion step and irradiates light on the three-dimensional object.

4. The three-dimensional shape color adjustment method according to claim 2, comprising a direction changing step of reflecting the changed direction of the three-dimensional object in the three-dimensional data converted in the data conversion step.

5. A three-dimensional object shaping method, wherein the colored layers are formed on the surface of the three-dimensional object by using the parameters determined by the three-dimensional shape color adjustment method according to claim 2.

6. The three-dimensional shape color adjustment method according to claim 1, wherein the color patch layering step causes a three-dimensional object shaping apparatus to form the colored layers depending on the layering of the three-dimensional color patches on layers of model materials formed based on the two-dimensional data.

7. The three-dimensional shape color adjustment method according to claim 6, comprising a light source invalidation step of invalidating a light source which is set in the three-dimensional data converted in the data conversion step and irradiates light on the three-dimensional object.

8. The three-dimensional shape color adjustment method according to claim 6, comprising a direction changing step of reflecting the changed direction of the three-dimensional object in the three-dimensional data converted in the data conversion step.

9. A three-dimensional object shaping method, wherein the colored layers are formed on the surface of the three-dimensional object by using the parameters determined by the three-dimensional shape color adjustment method according to claim 6.

10. The three-dimensional shape color adjustment method according to claim 1, comprising a light source invalidation step of invalidating a light source which is set in the three-dimensional data converted in the data conversion step and irradiates light on the three-dimensional object.

11. The three-dimensional shape color adjustment method according to claim 10, comprising a direction changing step of reflecting the changed direction of the three-dimensional object in the three-dimensional data converted in the data conversion step.

12. A three-dimensional object shaping method, wherein the colored layers are formed on the surface of the three-dimensional object by using the parameters determined by the three-dimensional shape color adjustment method according to claim 10.

13. The three-dimensional shape color adjustment method according to claim 1, comprising a direction changing step of reflecting the changed direction of the three-dimensional object in the three-dimensional data converted in the data conversion step.

14. A three-dimensional object shaping method, wherein the colored layers are formed on the surface of the three-dimensional object by using the parameters determined by the three-dimensional shape color adjustment method according to claim 13.

15. A three-dimensional object shaping method, wherein the colored layers are formed on the surface of the three-dimensional object by using the parameters determined by the three-dimensional shape color adjustment method according to claim 1.

16. A three-dimensional model color adjustment apparatus comprising:
a data conversion unit which converts three-dimensional data representing a three-dimensional object having colored layers formed on a surface thereof into two-dimensional data;
a two-dimensional color patch data creating unit which creates, as two-dimensional color patch data, a plurality of two-dimensional images in which at least one kind of parameter of a plurality of kinds of parameters related to a color of each layer of the colored layers in the converted two-dimensional data is set at a plurality of different levels;
a three-dimensional color patch data creating unit which applies thickness information about thicknesses of the colored layers depending on the number of layers of the colored layers to the two-dimensional color patch data to create three-dimensional color patch data; and
a color patch layering unit which layers three-dimensional color patches depending on the thickness according to the three-dimensional color patch data, wherein
the colored layers are formed with a plurality of inks by an inkjet method, and
the three-dimensional model color adjustment apparatus further comprises a color density adjusting unit which adjusts a color density parameter of each of the plurality of inks to create the two-dimensional color patch data.

* * * * *